US008576249B2

(12) United States Patent
Kumazawa (10) Patent No.: US 8,576,249 B2
(45) Date of Patent: Nov. 5, 2013

(54) MAP DISPLAY DEVICE

(75) Inventor: Kunitosi Kumazawa, Machida (JP)

(73) Assignee: Clarion Co., Ltd., Tokyo (JP)

( * ) Notice: Subject to any disclaimer, the term of this patent is extended or adjusted under 35 U.S.C. 154(b) by 349 days.

(21) Appl. No.: 12/936,315

(22) PCT Filed: Apr. 4, 2008

(86) PCT No.: PCT/JP2008/056783
§ 371 (c)(1),
(2), (4) Date: Jan. 26, 2011

(87) PCT Pub. No.: WO2009/122587
PCT Pub. Date: Oct. 8, 2009

(65) Prior Publication Data
US 2011/0109649 A1    May 12, 2011

(51) Int. Cl.
*G09G 5/00*    (2006.01)
*G01W 1/00*    (2006.01)

(52) U.S. Cl.
USPC ............................... 345/629; 345/619; 702/3

(58) Field of Classification Search
USPC ............................................. 345/629; 702/3
See application file for complete search history.

(56) References Cited

U.S. PATENT DOCUMENTS

| | | | | |
|---|---|---|---|---|
| 4,893,127 A * | 1/1990 | Clark et al. | ................... | 342/386 |
| 5,471,205 A * | 11/1995 | Izawa | ........................ | 340/995.27 |
| 5,717,589 A * | 2/1998 | Thompson et al. | ............... | 702/3 |
| 6,314,363 B1 * | 11/2001 | Pilley et al. | .................. | 701/120 |
| 6,339,747 B1 * | 1/2002 | Daly et al. | ....................... | 702/3 |
| 6,829,536 B2 * | 12/2004 | Moore | ............... | 702/3 |
| 7,474,317 B2 * | 1/2009 | Dolph et al. | .................. | 345/629 |
| 7,558,674 B1 * | 7/2009 | Neilley et al. | ..................... | 702/3 |
| 7,561,970 B1 * | 7/2009 | Neilley et al. | ..................... | 702/3 |
| 7,783,419 B2 * | 8/2010 | Taniguchi et al. | ............ | 701/454 |
| 7,788,036 B1 * | 8/2010 | Neilley et al. | .................... | 702/4 |
| 7,792,642 B1 * | 9/2010 | Neilley et al. | ..................... | 702/3 |
| 8,223,063 B2 * | 7/2012 | Kelly et al. | ................ | 342/26 R |
| 2003/0050757 A1 * | 3/2003 | Moore | ............... | 702/3 |
| 2004/0239550 A1 * | 12/2004 | Daly, Jr. | ..................... | 342/26 B |

(Continued)

FOREIGN PATENT DOCUMENTS

| | | |
|---|---|---|
| JP | 2002-320675 A | 11/2002 |
| JP | 2006-84250 A | 3/2006 |

OTHER PUBLICATIONS

NHK Broadcasting Culture Research Institute, Revised edition NHK Kisho Handbook, Japan Broadcast Publishing Co., Ltd., Oct. 10, 2006, pp. 128 to 129, Taifu no Kansokuho to Yoho.
International Search Report dated May 20, 2008 (One (1) page).

*Primary Examiner* — M Good Johnson
(74) *Attorney, Agent, or Firm* — Crowell & Moring LLP (57) ABSTRACT

There are provided: a map display control unit that brings up a map on display at a display monitor; a stormy weather condition information reception unit that receives stormy weather condition information; and a stormy weather condition information display control unit that provides a storm path forecast, indicating a predicted path of a storm, based upon the stormy weather condition information by superimposing the storm path forecast over the map on display at the display monitor. The stormy weather condition information display control unit displays the storm path forecast by using a fan-shaped range centered on a current position of the storm with an arc thereof passing through a predicted position that the storm is estimated to assume.

6 Claims, 10 Drawing Sheets

(56) References Cited

U.S. PATENT DOCUMENTS

| | | | |
|---|---|---|---|
| 2007/0049260 A1* | 3/2007 | Yuhara et al. | 455/414.3 |
| 2007/0221743 A1* | 9/2007 | Weinzapfel et al. | 239/14.1 |
| 2007/0223841 A1* | 9/2007 | Weinzapfel et al. | 382/325 |
| 2007/0225915 A1* | 9/2007 | Weinzapfel et al. | 702/3 |
| 2007/0268313 A1* | 11/2007 | Dolph et al. | 345/635 |
| 2009/0316671 A1* | 12/2009 | Rolf et al. | 370/338 |
| 2010/0238179 A1* | 9/2010 | Kelly | 345/473 |

* cited by examiner

MAP DISPLAY DEVICE

TECHNICAL FIELD

The present invention relates to a map display device that displays typhoon information (which includes hurricane information and cyclone information) by superimposing it over a map on display.

BACKGROUND ART

The navigation systems known in the related art include those capable of displaying a forecast range-circle around a point where the center of a typhoon is predicted to be at a specific time, in the form of a forecast circle (see, for instance, patent reference 1).
Patent reference 1: Japanese Laid Open Patent Publication No. 2006-84250

DISCLOSURE OF THE INVENTION

Problems to be Solved by the Invention

There is an issue to be addressed in the navigation system disclosed in patent reference 1 in that the typhoon information provided at the navigation system, with the typhoon forecast circle taking up a significant area in the display at the monitor, may not be viewed easily.

Means for Solving the Problems

A map display device according to the present invention comprises: a map display control unit that brings up a map on display at a display monitor; a stormy weather condition information reception unit that receives stormy weather condition information; and a stormy weather condition information display control unit that provides a storm path forecast, indicating a predicted path of a storm, based upon the stormy weather condition information by superimposing the storm path forecast over the map on display at the display monitor, wherein: the stormy weather condition information display control unit displays the storm path forecast by using a fan-shaped range centered on a current position of the storm with an arc thereof passing through a predicted position that the storm is estimated to assume.

The map display device further comprises a predicted position selection unit that selects a first predicted position and a second predicted position among a plurality of predicted positions that the storm is estimated to assume, and it is preferable that the predicted position selection unit selects, as the second predicted position, a predicted position corresponding to a latest time point among the plurality of predicted positions and selects, as the first predicted position, a predicted position closest to a halfway point between the current position of the storm and the second predicted position; and
the stormy weather condition information display control unit displays the storm path forecast by using two fan-shaped ranges, one centered on the current position of the storm with an arc thereof passing through the first predicted position and another centered on the first predicted position with an arc thereof passing through the second predicted position.

When at least one of a distance between the current position of the storm and the first predicted position, as indicated on a display screen at the display monitor, and a distance between the first predicted position and the second predicted position, as indicated on the display screen at the display monitor, is less than a first value and a distance between the current position of the storm and the second predicted position, as indicated on the display screen at the display monitor, is equal to or greater than the first value, the stormy weather condition information display control unit displays the storm path forecast by using a fan-shaped range centered on the current position of the storm with an arc thereof passing through the second predicted position, instead of the two fan-shaped ranges.

When a distance between the current position of the storm and the second predicted position, as indicated on a display screen at the display monitor, is less than a first value, a distance between the current position of the storm and the first predicted position, as indicated on the display screen at the display monitor, is less than the first value and a distance between the first predicted position and the second predicted position, as indicated on the display screen at the display monitor, is less than the first value, the stormy weather condition information display control unit may display no fan-shaped range.

It is preferable that the first value represents a size of an icon indicating the storm.

When a distance between the current position of the storm and the first predicted position, as indicated on a display screen at the display monitor, is equal to or greater than a second value, the stormy weather condition information display control unit displays, instead of the fan-shaped range centered on the current position of the storm with the arc thereof passing through the first predicted position, a fan-shaped range centered on the current position of the storm and having an arc passing through a point on a straight line connecting the current position of the storm and the first predicted position, which is set apart from the current position of the storm by a distance represented by the second value.

Advantageous Effect of the Invention

According to the present invention, a predicted path of a typhoon is indicated with a fan-shaped range centered on the current position of the typhoon, with the arc of the fan drawn so as to contain a predicted typhoon position. Through these measures, the typhoon information including a predicted typhoon path and the like can be displayed in a compact format so as to allow the information to be read easily.

BRIEF DESCRIPTION OF THE DRAWINGS

FIG. 1 A block diagram showing the structure adopted in the navigation system achieved in an embodiment of the present invention
FIG. 2 A map providing hurricane information
FIG. 3 A flowchart of the hurricane information display processing executed in the embodiment of the present invention
FIG. 4 Diagrams illustrating how hurricane information image data may be created
FIG. 5 Variations of the fan-shaped range used to indicate the predicted hurricane path
FIG. 6 Variations of the range display used to indicate the predicted hurricane path
FIG. 7 Diagrams illustrating the relationship between the fan shape(s) indicating the predicted hurricane path and predicted hurricane positions
FIG. 8 A diagram illustrating the relationship between the range display indicating the predicted hurricane path and predicted hurricane positions FIG. 9 Fan-shaped ranges indicating the predicted hurricane path, assuming a different central angle FIG. 10 An illustration of a fan-shaped range brought up on display based upon a hurricane forecast circle

BEST MODE FOR CARRYING OUT THE INVENTION

Figure 1:
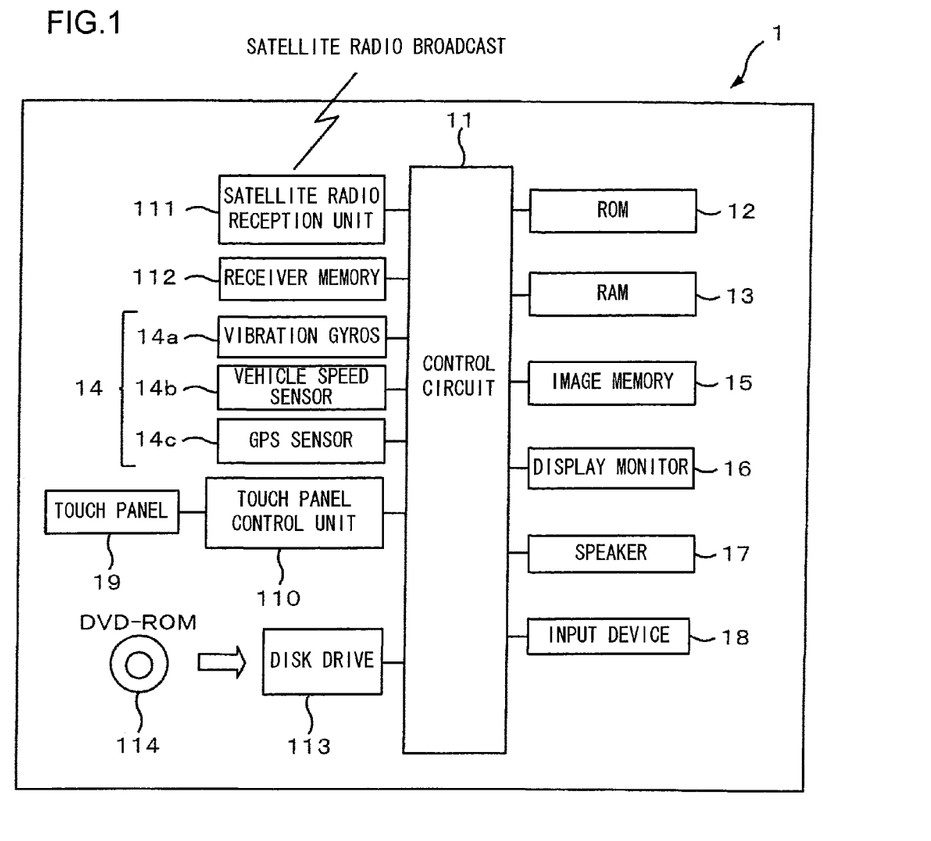

FIG. 1 shows a navigation system 1 achieved in an embodiment of the present invention. The navigation system 1 is capable of displaying weather information received through a satellite radio broadcast by superimposing the weather information over a map on display at a display monitor 16. Satellite radio broadcasters in the known art include, for instance, Sirius Satellite Radio. The navigation system 1 comprises a control circuit 11, a ROM 12, a RAM 13, a current position detection device 14, an image memory 15, the display monitor 16, a speaker 17, an input device 18, a touch panel 19, a touch panel control unit 110, a satellite radio reception unit 111, a receiver memory 112 and a disk drive 113. A DVD-ROM 114 with map data stored therein is loaded into the disk drive 113.

The control circuit 11, constituted with a microprocessor and its peripheral circuits, executes various types of control as it executes a control program stored in the ROM 12 by using the RAM 13 as a work area. The results of a specific type of route search processing executed by the control circuit 11 based upon the map data stored in the DVD-ROM 114, are brought up on display as a recommended route at the display monitor 16.

The current position detection device 14 detects the current location of the vehicle. The current position detection device 14 is constituted with a vibration gyro 14a, a vehicle speed sensor 14b, a GPS (global positioning system) sensor 14c and the like. The vibration gyro 14a detects the direction along which the vehicle is advancing. The vehicle speed sensor 14b detects the vehicle speed. The GPS sensor 14c detects GPS signals transmitted from GPS satellites. Based upon the current location of the vehicle detected by the current position detection device 14, the navigation system 1 determines a map display range, a route search start point and the like. In addition, it indicates the current vehicle position as a subject vehicle position mark on the map.

In the image memory 15, image data to be displayed at the display monitor 16 are stored. Such image data include road-map drawing data and various types of graphics data. These image data are generated by the control circuit 11 as needed based upon the map data stored in the DVD-ROM 114 and the like. The navigation system 1 is able to provide a map display and the like by using the image data thus generated.

The disk drive 113 reads out map data from the DVD-ROM 114. The map data include map display data and route search data. The map display data and the route search data include link information and node information related to the roads in the map data. The map display data include map data at seven different scaling factors from a wide range through a narrow range of greatest detail. The scaling factor of the map on display can be thus adjusted to one of the seven different levels in response to a user request. It is to be noted that map data may be read out via a recording medium other than the DVD ROM 114, such as a CD-ROM or a hard disk.

Various types of information including a map of an area around the subject vehicle position are provided, based upon various types of information such as map data, to the user as a screen display brought up at the display monitor 16. Through the speaker 17, voice messages prompting the user to perform various types of input operations or providing route guidance to the user are output. The input device 18, which includes operation keys operated by the user to select various command settings and the like, is constituted with button switches on an operation panel, hardware switches disposed around the panel and the like. In addition, the user operates the input device 18 to alter the scaling factor of the map or to scroll the map on display at the display monitor 16. For instance, the map at a scaling factor of 1/50,000 is displayed by specifying "1/50000". The user also sets a destination by manually operating the input device 18 in response to instructions provided on the display screen at the display monitor 16 or voice instructions output through the speaker 17. Furthermore, the user operates the input device 18 to select a specific satellite radio broadcast station.

Once a destination has been set by the user, the navigation system 1 executes route calculation to determine a route to the destination based upon a specific algorithm by designating the current location detected via the current position detection device 14 as a start point. The route (hereafter referred to as a recommended route) thus determined is indicated on the screen display in a display mode distinguishable from other roads by, for instance, using a different display color. The user is thus able to identify the recommended route on the map on the screen display. In addition, the navigation system 1 guides the vehicle along the route by indicating to the user a specific direction along which the vehicle should advance through instructions provided on the screen or through voice instructions, so that the vehicle travels along the recommended route.

The touch panel 19 is a transparent touch switch laminated over the surface of the display monitor 16. An image brought up on display at the display monitor 16 is thus viewed through the touch panel 19. This also means that as the user touches the screen display brought up at the display monitor 16, the touch panel 19 is depressed. The touch panel 19 outputs a signal corresponding to an operating position at which the touch panel 19 is depressed, to the touch panel control unit 110. The touch panel control unit 110 then calculates the position at which the touch panel 19 has been depressed.

As the user presses any of various buttons, display menu items or the like on display at the display monitor 16 with his finger or the like, the touch panel 19 is depressed and the processing defined in correspondence to the particular button or display menu item is executed.

The satellite radio reception unit 111 receives a satellite radio broadcast provided from a satellite radio station (not shown) via an artificial satellite and outputs the received satellite radio broadcast to the control circuit 11. The satellite radio broadcast having been received is output through the speaker 17. In addition, weather information provided in the satellite radio broadcast having been received at the satellite radio reception unit 111 is stored into the receiver memory 112.

The weather information provided in the satellite radio broadcast includes weather map information, stormy weather information on typhoons, hurricanes and the like, precipitation distribution information collected via weather radar, information on wind direction and wind strength observed at various observation points and the like. The weather map information may include, for instance, information indicating the position (latitude/longitude) of a high-pressure system or a low pressure system, information indicating the position of a warm front or a cold front, isobaric chart information and barometric pressure information. The stormy weather information will include information indicating the positions of a typhoon, a hurricane, a tornado, an ice storm, a hailstorm, a thunder storm and the like, information indicating the directions along which the stormy weather is moving and information predicting how the stormy weather is likely to advance. The precipitation distribution information indicates the position of an area experiencing rainfall, the rate of precipitation at the particular position and the like.

The receiver memory 112 is constituted with a rewritable non-volatile recording medium such as a flash memory or a hard disk. The weather information received via the satellite radio reception unit 111 is stored into the receiver memory 112. The weather information stored in the receiver memory 112 is displayed on a map in the form of icons, isobars, cold fronts or the like.

Figure 2:
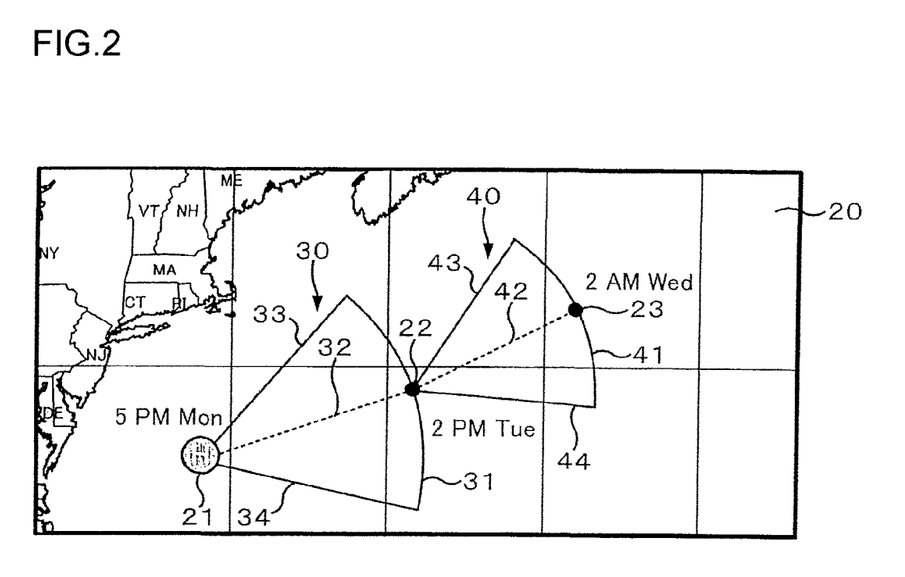

Next, in reference to FIG. 2, the hurricane information display processing executed in the embodiment of the present invention is described. FIG. 2 shows a map 20 providing hurricane information. An icon 21, a first predicted point 22 and a second predicted point 23 are superimposed on the map 20. The icon 21 indicates the current hurricane position (at 5 PM Monday). The first predicted point 22 indicates the position that the hurricane is estimated to assume at 2 PM Tuesday. The second predicted point 23 indicates the position that the hurricane is estimated to assume at 2 AM Wednesday.

In order to enable the user to view the predicted hurricane path with ease, two fan-shaped ranges 30 and 40 are displayed on the map 20. The fan-shaped range 30 allows the predicted path of the hurricane from the current position (the position of the icon 21) to the first predicted point 22 to be read with ease. The fan-shaped range 30 is drawn by aligning its center with the current hurricane position (the position of the icon 21) and ensuring that an arc 31 of the fan-shaped range 30 extends through the first predicted point 22. The angles formed by a dotted line 32 connecting the current hurricane position (the position of the icon 21) and the first predicted point 22, and a radius 33 of the fan-shaped range 30, and by the dotted line 32 and a radius 34 of the fan-shaped range 30 are both 30°.

The fan-shaped range 40 allows the predicted path of the hurricane from the first predicted point 22 to the second predicted point 23 to be read with ease. The fan-shaped range 40 is drawn by aligning its center with the first predicted point 22 and ensuring that an arc 41 of the fan-shaped range 40 extends through the second predicted point 23. The angles formed by a dotted line 42 connecting the first predicted point 22 and the second predicted point 23, and a radius 43 of the fan-shaped range 40, and by the dotted line 42 and the radius 44 of the fan-shaped range 40 are both 30°.

Figure 3:
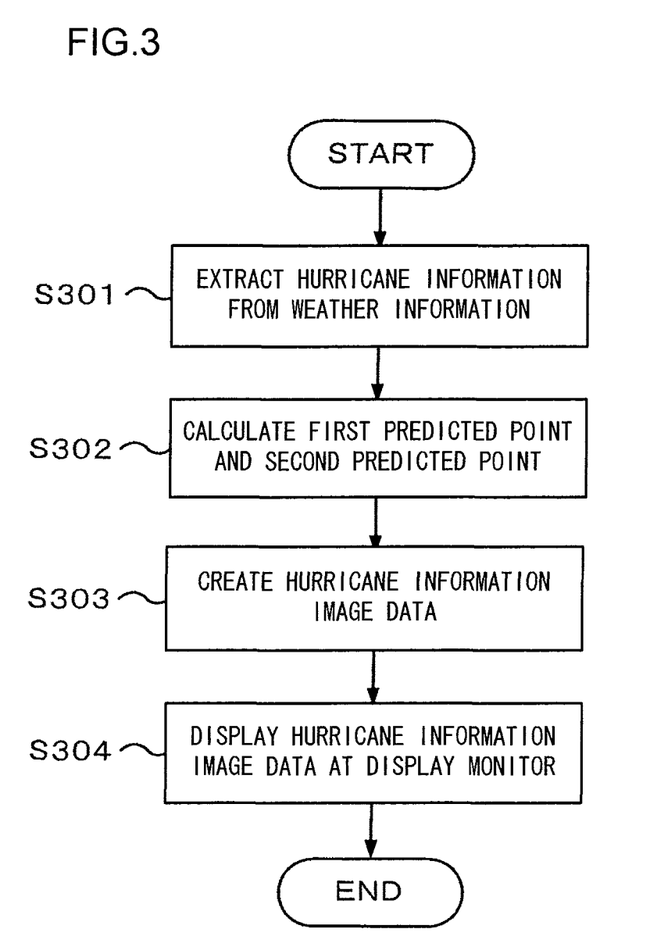
Figure 4:
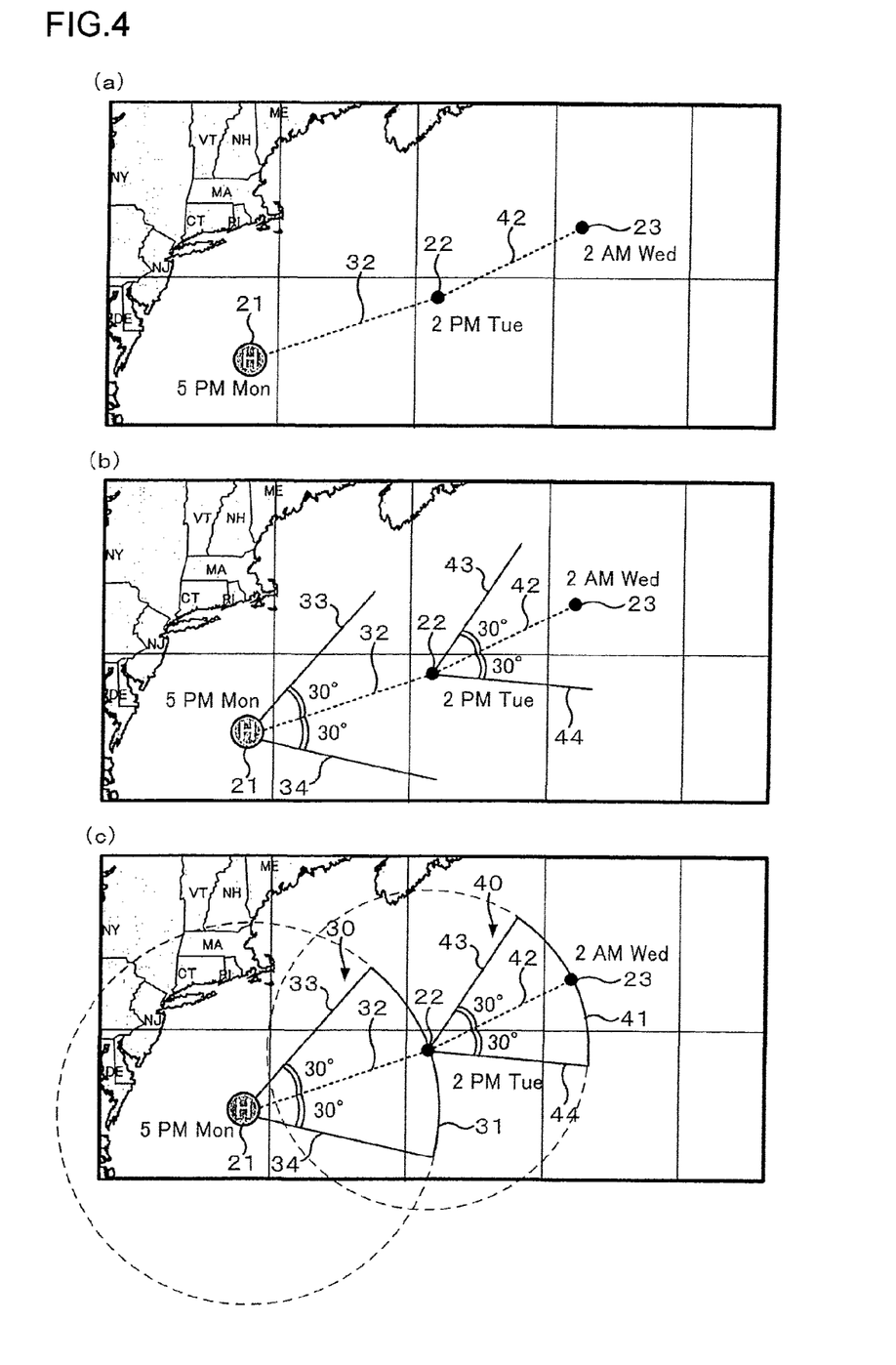

Next, in reference to the flowchart presented in FIG. 3 and the diagrams presented in FIG. 4, the hurricane information display processing executed in the embodiment of the present invention is described. The processing in FIG. 3 is executed by the control circuit 11 based upon a program started up as "display hurricane information" is selected in a menu (not shown).

In step S301, hurricane information is extracted from the weather information having been received via the satellite radio reception unit 111. In step S302, a first predicted point and a second predicted point are determined. The "second predicted point" in this context refers to the position that the hurricane is estimated to assume at the latest time point among the predicted hurricane positions included in the extracted hurricane information. The "first predicted point" refers to the predicted hurricane position closest to the halfway point between the current hurricane position and the second predicted point, among the predicted hurricane positions included in the hurricane information.

In step S303, hurricane information image data are created by superimposing the hurricane information over a map. In reference to the diagrams in FIG. 4, the creation of hurricane information image data is described. The hurricane icon 21 is drawn at the current hurricane position as shown in FIG. 4(a). The first predicted point 22 and the second predicted point 23 are also drawn as shown in the figure.

Then, as shown in FIG. 4(b), the radii 33 and 34, each forming a 30° angle relative to the dotted line 32 connecting the current hurricane position (the position of the icon 21) and the first predicted point 22 are drawn. In addition, the radii 43 and 44, each forming a 30° angle relative to the dotted line 42 connecting the first predicted point 22 and the second predicted point 23, are drawn.

Next, the arc 31 centered on the current hurricane position (the position of the icon 21) and passing through the first predicted point 22 and the arc 41 centered on the first predicted point 22 and passing through the second predicted point 23 are drawn as shown in FIG. 4(c). Hurricane information image data with the fan-shaped ranges 30 and 40 drawn over the map are created through the procedure described above. The hurricane information image data thus created are then stored into the image memory 15.

In step S304 in FIG. 3, the hurricane information image data are brought up on display at the display monitor 16.

The following advantages are achieved through the embodiment of the navigation system 1 in the present invention described above.

(1) The predicted hurricane path is indicated with a fan-shaped range centered on the current hurricane position with the arc thereof passing through a position that the hurricane is estimated to assume. The hurricane information such as the predicted hurricane path provided in this display format can be read with better ease.

(2) Among the predicted hurricane positions, the position closest to the halfway point between the second predicted position to be assumed by the hurricane at the latest time point and the current hurricane position is selected as the first predicted position. Then, a fan-shaped range centered on the current hurricane position with the arc thereof passing through the first predicted position and a fan-shaped range centered on the first predicted position with the arc thereof passing through the second predicted position are displayed. As a result, the path along which the hurricane is predicted to advance from the current position to the predicted hurricane position at the latest time point among the various prediction time points can be easily read.

The embodiment described above allows for the following variations.

(1) The fan-shaped range display mode may be altered in correspondence to the distance between the current hurricane position and the first predicted point as indicated on the display screen, the distance between the first predicted point and the second predicted point as indicated on the display screen at the display monitor 16 and the distance between the current hurricane position and the second predicted point as indicated on the display screen.

For instance, when the distance between the current hurricane position 21 and the first predicted point 22 is equivalent to 20 pixels or more, the distance between the first predicted point 22 and the second predicted point 23 is equivalent to 20 pixels or more and the distance between the current hurricane position and the second predicted point 23 as indicated on the display screen is equivalent to 20 pixels or more, the predicted path along which the hurricane is predicted to advance from its current position to the second predicted point 23 may be indicated with two fan-shaped ranges 30 and 40, as shown in FIG. 5(a).

When the distance between the current hurricane position 21 and the first predicted point 22 is equivalent to fewer than 20 pixels, the distance between the first predicted point 22 and the second predicted point 23 is equivalent to 20 pixels or more and the distance between the current hurricane position and the second predicted point 23 as indicated on the display screen is equivalent to 20 pixels or more. However, the predicted path along which the hurricane is predicted to advance from its current position to the second predicted point 23 may be indicated with a single fan-shaped range 50, as shown in FIG. 5(*b*).

Figure 5:
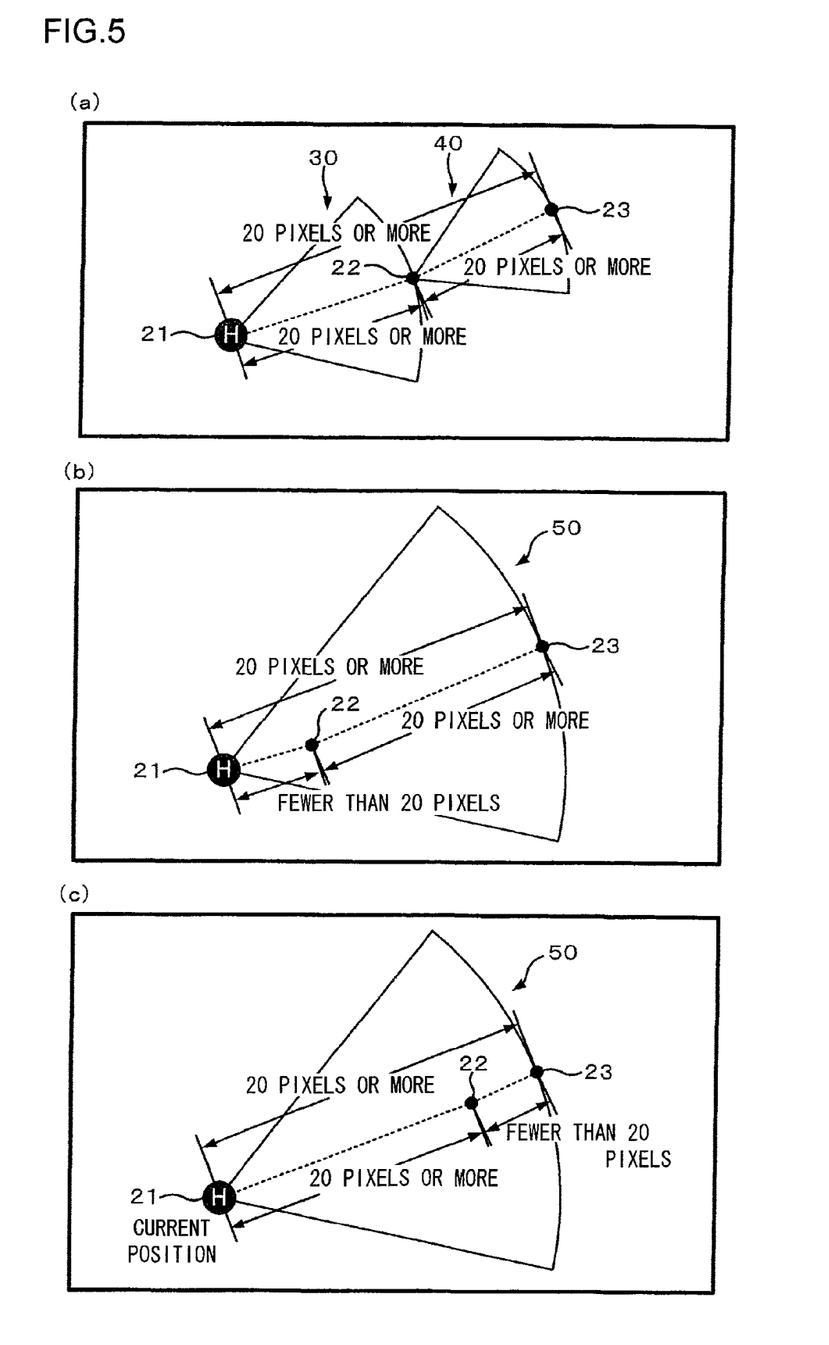

Moreover, when the distance between the current hurricane position 21 and the first predicted point 22 is equivalent to 20 pixels or more, the distance between the first predicted point 22 and the second predicted point 23 is equivalent to fewer than 20 pixels and the distance between the current hurricane position and the second predicted point 23 as indicated on the display screen is equivalent to 20 pixels or more, the predicted path along which the hurricane is predicted to advance from its current position to the second predicted point 23 may be indicated with a single fan-shaped range 50, as shown in FIG. 5(*c*).

A fan-shaped range 30 or 40 displayed when the distance between the current hurricane position and the first predicted point 22 as indicated on the display screen or the distance between the first predicted point 22 and the second predicted point 23 as indicated on the display screen is very small, will be extremely small and there will be no point in displaying such a small fan-shaped range.

For the same reason, a single fan-shaped range 50 may be used to indicate the path of the hurricane along which it is predicted to advance from its current position to the second predicted point 23 when the distance between the current hurricane position 21 and the first predicted point 22 is equivalent to fewer than 20 pixels, the distance between the first predicted point 22 and the second predicted point 23 is fewer than 20 pixels and the distance between the current hurricane position 21 and the second predicted point 23 is also equivalent to fewer than 20 pixels.

Figure 6:
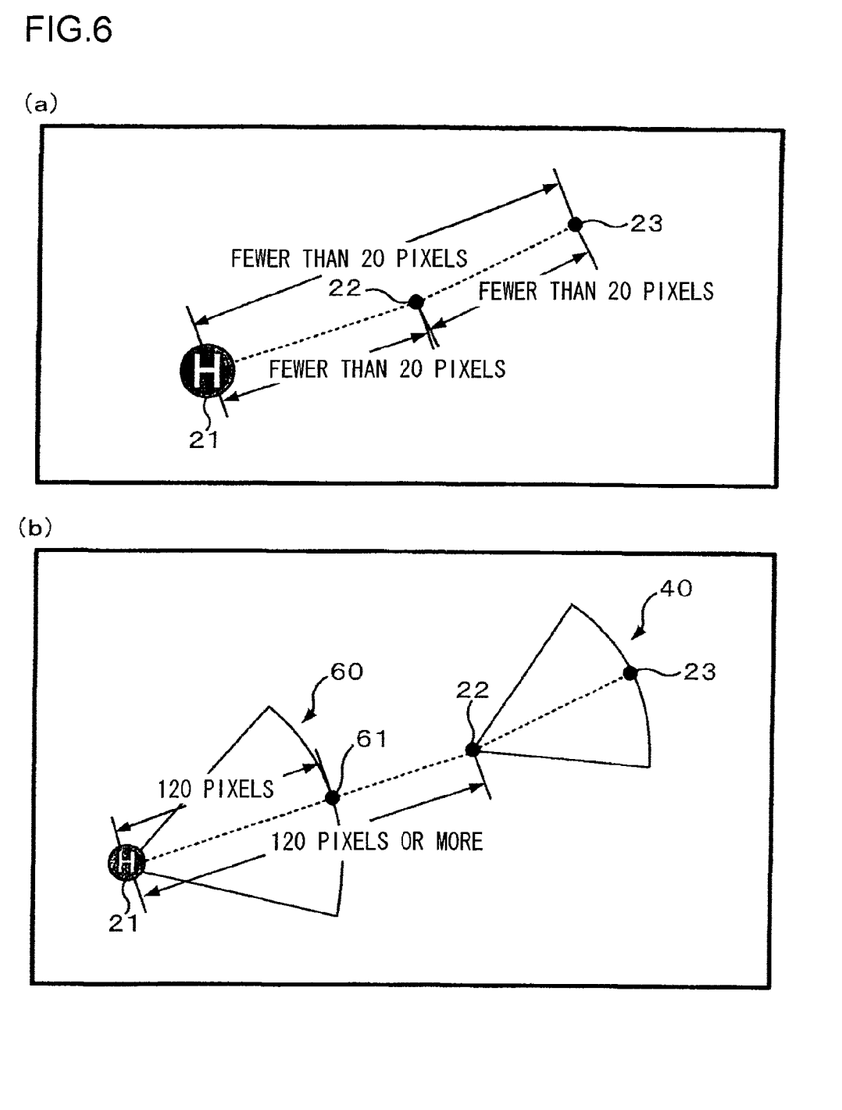

In addition, when the distance between the current hurricane position and the first predicted point 22 is equivalent to fewer than 20 pixels, the distance between the first predicted point 22 and the second predicted point 23 is equivalent to fewer than 20 pixels and the distance between the current hurricane position and the second predicted point 23 is equivalent to fewer than 20 pixels, the fan-shaped range display may be suspended, as shown in FIG. 6(*a*), since display of a fan-shaped range under these conditions will crowd the screen and compromise the readability of the hurricane information.

When the distance between the current hurricane position and the first predicted point 22 is equivalent to 120 pixels or more, a fan-shaped range 60 with the arc thereof passing through a point 61, which is present on the straight line connecting the current hurricane position and the first predicted point and indicates a distance equivalent to 120 pixels from the current hurricane position, may be displayed as shown in FIG. 6(*b*) instead of the fan-shaped range with the arc thereof passing through the first predicted point 22, which is bound to be excessively large under these circumstances.

The distance between the current hurricane position and the first predicted point 22 and the distance between the first predicted point 22 and the second predicted point 23 used as the decision-making criteria for the fan-shaped range display mode adjustment are not limited to those equivalent to 20 pixels and 120 pixels, and optimal distances should be selected to be used as the decision-making criteria in correspondence to the resolution of the display monitor 16 and the size of the display monitor 16. In addition, a decision as to whether the predicted hurricane path is to be indicated with a single fan-shaped range or two fan-shaped ranges or to indicate the path with no fan-shaped range may be made in reference to the size of the hurricane icon 21 (the length, the width, the diameter or the like of the icon 21), since there will be little point in displaying a very small fan-shaped range, i.e., smaller than the hurricane icon 21.

Figure 7:
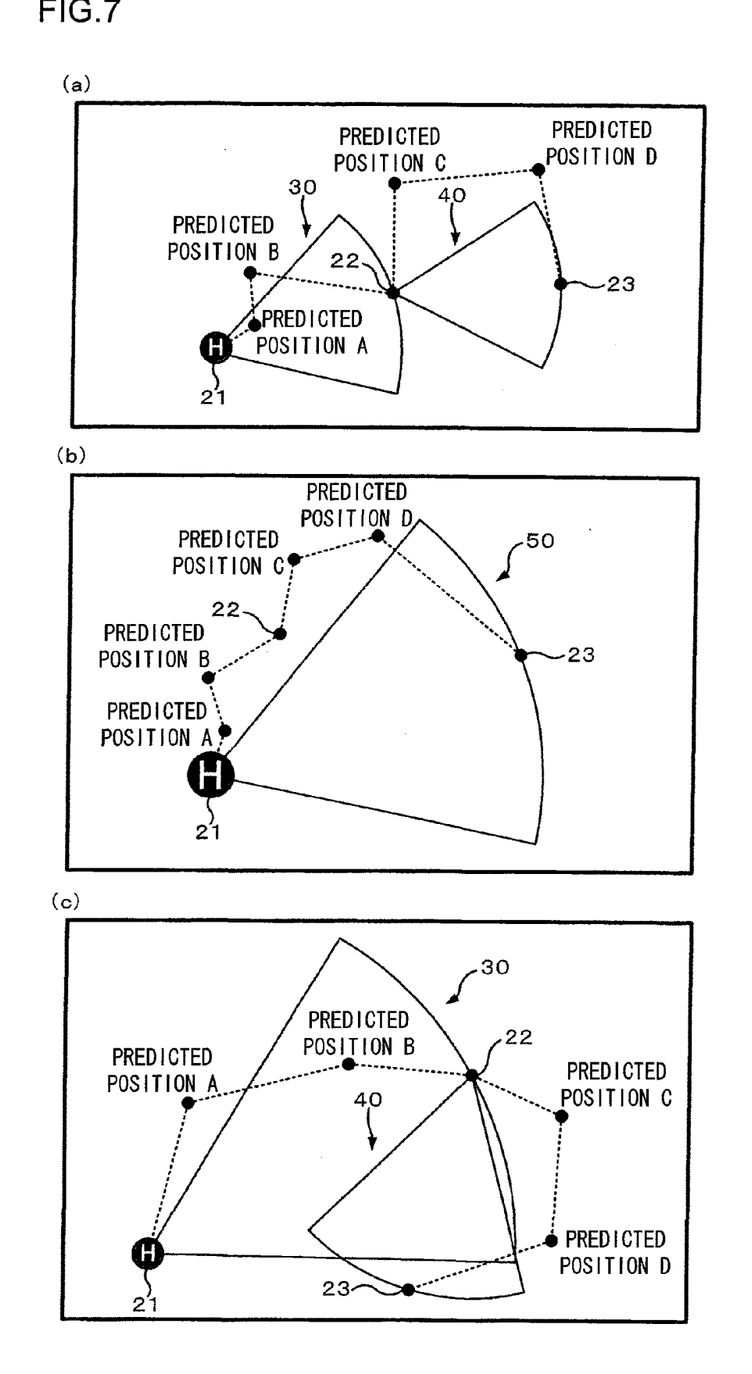
Figure 8:
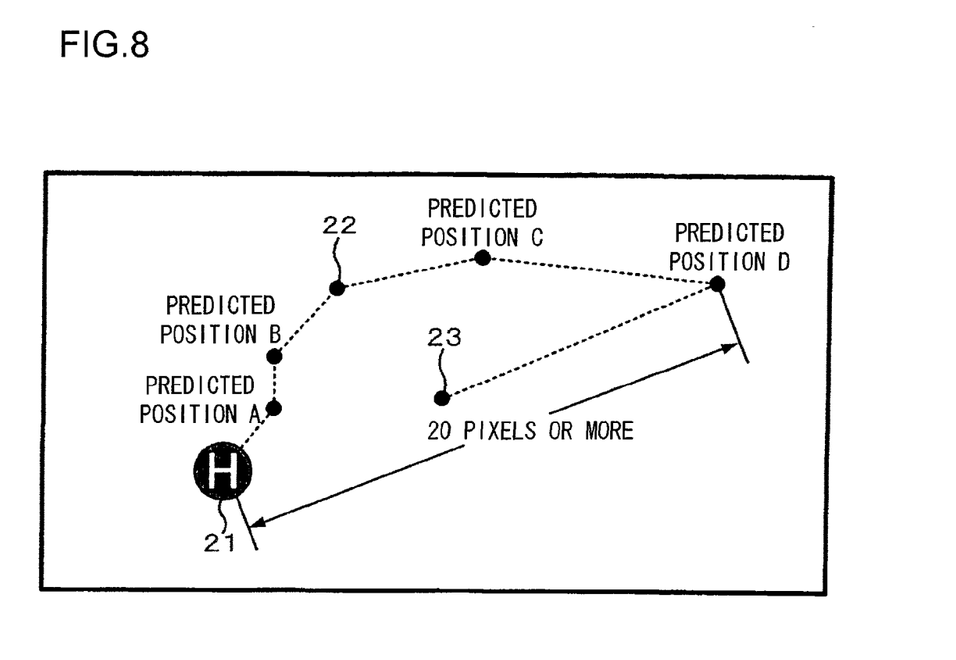

(2) The fan-shaped ranges 30, 40 and 50 according to the present invention are drawn based upon the first predicted position and the second predicted position among the predicted hurricane positions and the display is not affected by the other predicted hurricane positions. For instance, while predicted hurricane positions A through D may deviate greatly from the line connecting the current hurricane position and the first predicted point 22 and the line connecting the first predicted point 22 and the second predicted point 23, fan-shaped ranges 30 and 40 will be displayed based upon the current hurricane position and the first predicted point 22 and based upon the first predicted point 22 and the second predicted point 23 respectively, As illustrated in FIGS. 7(*a*)~7(*c*). In addition, as illustrated in FIG. 8, the fan-shaped range display will not be brought up on display even if the predicted position D is present over a distance equivalent to 20 pixels or more from the current hurricane position, as long as the distance between the current hurricane position and the first predicted point 22 is equivalent to fewer than 20 pixels, the distance between the first predicted point 22 and the second predicted point 23 is equivalent to fewer than 20 pixels and the distance between the current hurricane position and the second predicted point 23 is equivalent to fewer than 20 pixels.

Figure 9:
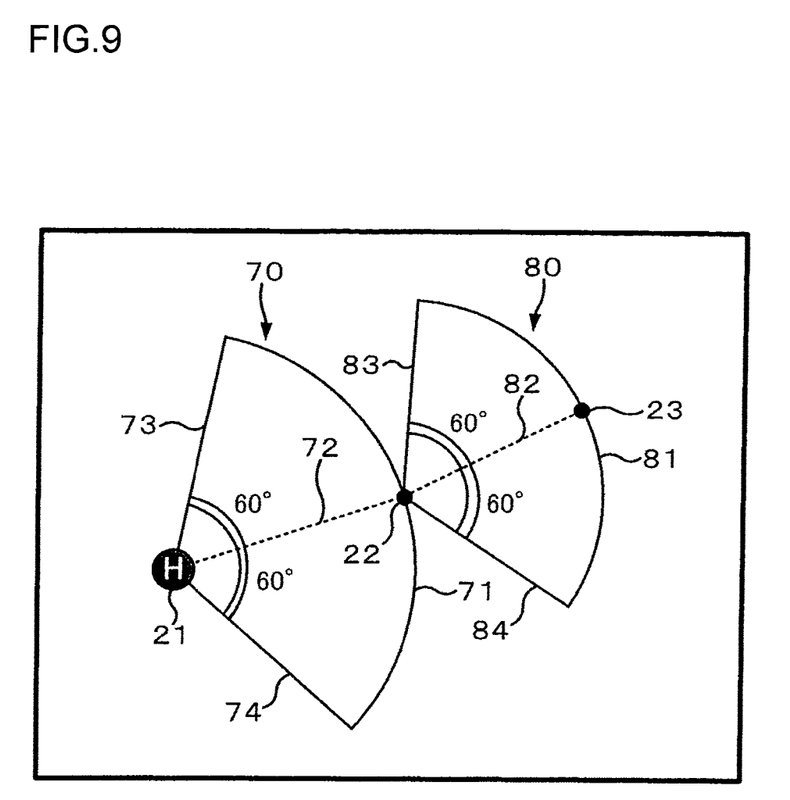

(3) Provided that the fan-shaped ranges do not take up too much space, the angle formed by the dotted line 32 connecting the current hurricane position and the first predicted point relative to the radius of the fan-shaped range and the angle formed by the dotted line connecting the first predicted point and the second predicted point relative to the radius of the fan-shaped range may be set to a value other than 30°. For instance, fan-shaped ranges 70 and 80 assuming a 60° angle as shown in FIG. 9 may be displayed.

Figure 10:
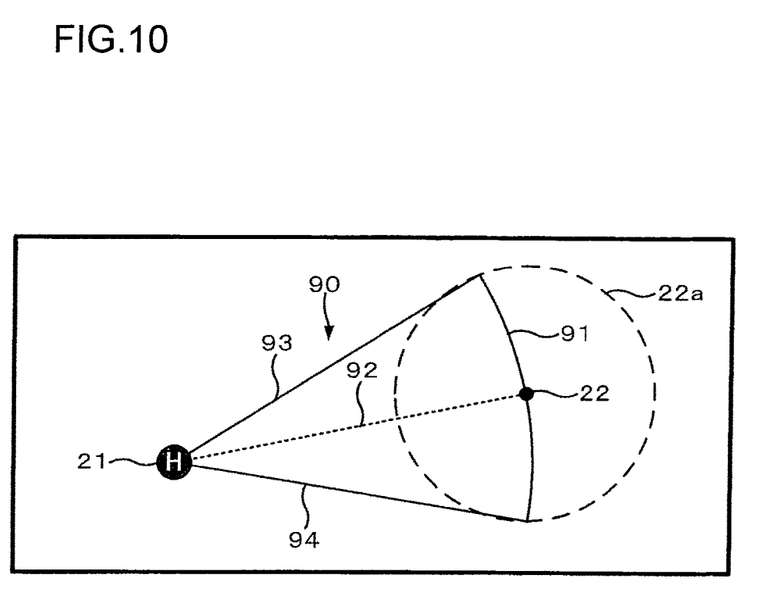

(4) As an alternative, a fan-shaped range 90 indicating the predicted hurricane path, with radii 93 and 94 thereof aligned with the straight lines connecting the current hurricane position and the intersecting points at which an arc 91 of the fan-shaped range 90 and a hurricane forecast circle 22*a* intersect each other as shown in FIG. 10, may be displayed. Since this display allows the user to quickly recognize the high probability range between the radius 93 and the radius 94 of the fan-shaped range 90 through which the hurricane is likely to travel, better convenience is assured for the user of the navigation system 1.

(5) The information brought up on display at the map display device according to the present invention is not limited to hurricane information, as long as the information relates to stormy weather conditions. For instance, typhoon information or cyclone information may be displayed. In the description of the present invention, the term "stormy weather condition information" is used to refer to typhoon information, hurricane information and cyclone information.

(6) The present invention may be adopted in a different type of map display device other than the navigation system 1. For instance, typhoon information may be displayed as described above on a portable telephone having map display capability.

The present invention allows the embodiment and any one of the variations to be adopted in combination or the embodiment and a plurality of variations to be adopted in combination. In addition, the variations may be adopted in any combination thereof.

The embodiment described above simply represents an example and the present invention is in no way limited to the embodiment.

The invention claimed is:

1. A map display device, comprising:
   a map display control unit that brings up a map on display at a display monitor;
   a stormy weather condition information reception unit that receives stormy weather condition information;
   a stormy weather condition information display control unit that provides a storm path forecast, indicating a predicted path of a storm, based upon the stormy weather condition information by superimposing the storm path forecast over the map on display at the display monitor; and
   a predicted position selection unit that selects a first predicted position and a second predicted position among a plurality of predicted positions that the storm is estimated to assume; wherein:
      the predicted position selection unit selects, as the second predicted position, a predicted position corresponding to a latest time point among the plurality of predicted positions and selects, as the first predicted position, a predicted position closest to a halfway point between the current position of the storm and the second predicted position; and
      the stormy weather condition information display control unit displays the storm path forecast by using two fan-shaped ranges, one centered on the current position of the storm with an arc thereof passing through the first predicted position and another centered on the first predicated position with an arc thereof passing through the second predicted position.

2. A map display device according to claim 1, wherein:
   when at least one of a distance between the current position of the storm and the first predicted position, as indicated on a display screen at the display monitor, and a distance between the first predicted position and the second predicted position, as indicated on the display screen at the display monitor, is less than a first value and a distance between the current position of the storm and the second predicted position, as indicated on the display screen at the display monitor, is equal to or greater than the first value, the stormy weather condition information display control unit displays the storm path forecast by using a fan-shaped range centered on the current position of the storm with an arc thereof passing through the second predicted position, instead of the two fan-shaped ranges.

3. A map display device according to claim 2, wherein:
   the first value represents a size of an icon indicating the storm.

4. A map display device according to claim 1, wherein:
   when a distance between the current position of the storm and the second predicted position, as indicated on a display screen at the display monitor, is less than a first value, a distance between the current position of the storm and the first predicted position, as indicated on the display screen at the display monitor, is less than the first value and a distance between the first predicted position and the second predicted position, as indicated on the display screen at the display monitor, is less than the first value, the stormy weather condition information display control unit displays no fan-shaped range.

5. A map display device according to claim 4, wherein:
   the first value represents a size of an icon indicating the storm.

6. A map display device according to claim 1, wherein:
   when a distance between the current position of the storm and the first predicted position, as indicated on a display screen at the display monitor, is equal to or greater than a second value, the stormy weather condition information display control unit displays, instead of the fan-shaped range centered on the current position of the storm with the arc thereof passing through the first predicted position, a fan-shaped range centered on the current position of the storm and having an arc passing through a point on a straight line connecting the current position of the storm and the first predicted position, which is set apart from the current position of the storm by a distance represented by the second value.

* * * * *